Aug. 21, 1956   A. J. DANEK   2,760,113
SIGNAL LIGHT SYSTEM FOR MOTOR VEHICLES
Filed Feb. 13, 1952
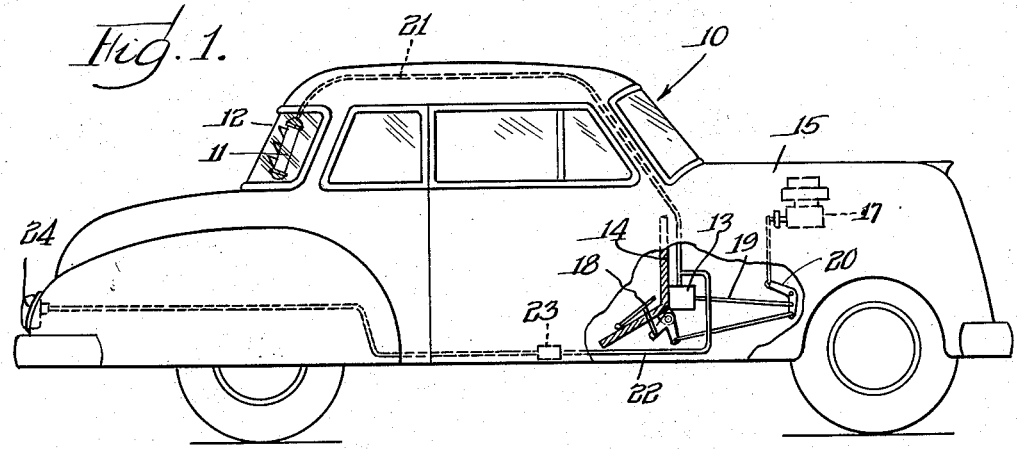
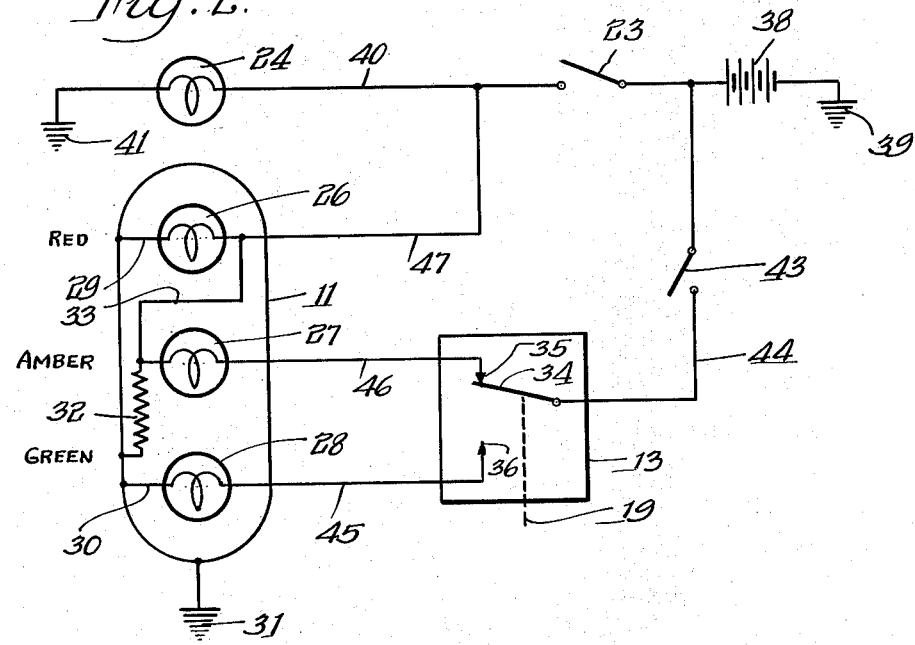
INVENTOR.
August J. Danek
BY
Wallenstein & Spangenberg
attys.

United States Patent Office 2,760,113
Patented Aug. 21, 1956

2,760,113

SIGNAL LIGHT SYSTEM FOR MOTOR VEHICLES

August J. Danek, Berwyn, Ill., assignor, by mesne assignments, to Auto Lamp Manufacturing Company, Chicago, Ill., a copartnership Application February 13, 1952, Serial No. 271,305

5 Claims. (Cl. 315—80)

This invention relates to a signal light system for a motor vehicle such as an automobile or the like for advising operating conditions to following vehicles. The signal light system of this invention is an improvement over those disclosed and claimed in Oscar W. Dorfman and Ernest Peters application Serial No. 245,196, filed on September 5, 1951, and Charles B. Spangenberg application Serial No. 245,119, filed on September 5, 1951.

The signal light system of this invention, as well as the systems of the above two mentioned pending applications, include red, amber and green signal lights facing the rear of the motor vehicle, which are controlled through switching means by the brake and accelerator mechanisms of the motor vehicle, the arrangement being such that the green signal light is illuminated to signal normal progress or safety when the accelerator is depressed, the amber signal light is illuminated to signal coasting, slow-down or caution when the accelerator is released, and the red signal light is illuminated to signal stopping or danger when the brakes are applied. In the aforementioned pending applications relays and plural switch means are utilized for the purpose of controlling the signal lights from the accelerator mechanism and the standard stop light switch. By reason of the instant invention the use of relays and plural switches is eliminated thereby greatly reducing the manufacturing and installation costs of the signal light system and also greatly simplifying the same.

The principal object of this invention is to provide an improved signal light system for a motor vehicle which is simple and rugged in construction and foolproof in operation, which may be operated directly from an accelerator operated switch means and the standard stop light switch without the inclusion of relays or the like, which may be inexpensively manufactured, and which may be quickly and inexpensively installed as original equipment or as an accessory to a motor vehicle.

The signal light system includes two main components, a signal light housing having the red, amber and green signal lights, and switching means for controlling the signal lights. The signal light housing is arranged at the rear of the motor vehicle with the signal lights thereof rearwardly exposed. The switching means includes a brake operated switch, such as the standard stop light switch, which is closed when the vehicle brakes are applied, and also includes switching means, such as a single pole double throw switch, operated by the accelerator mechanism of the motor vehicle. The accelerator operated switch means may be located at a place adjacent the accelerator mechanism to be operated thereby. Suitable electrical connections extend from the signal light housing to the brake operated switch and the accelerator operated switch means and to the voltage source of the vehicle.

Preferably, an electrical circuit extends between the voltage source and ground and includes the accelerator operated switch means and the green signal light for illuminating the green signal light when the accelerator mechanism is depressed. Another electrical circuit extends between the voltage source and ground and includes the accelerator operated switch, the amber signal light and a resistor for illuminating the amber signal light when the accelerator mechanism is released. A further electrical circuit extends between the brake operated switch and ground and includes the red signal light for illuminating the red signal light upon application of the vehicle brakes. Still another electrical circuit extends between the brake operated switch and ground and includes the resistor for preventing illumination of the amber light when the red signal light is illuminated. The resistor connected between the amber signal light and ground permits sufficient current flow through the amber signal light to illuminate the same when the accelerator mechanism is released but, at the same time, so limits the current flow through the red signal light and the standard stop light to prevent illumination thereof. When the vehicle brakes are applied the resistor permits sufficient current flow through the red signal light and the standard stop light to illuminate the same but, at the same time, so limits the current flow through the amber signal light to prevent illumination thereof. These electrical circuits, therefore, permit direct connection of the signal lights to the brake operated and accelerator operated switches for direct control thereby without the inclusion of relays or the like.

The signal light system of this invention may take the form of an accessory to be applied to motor vehicles or it may be in the form of original equipment. In the latter event it may be desirable to incorporate the signal lights into the body of the motor vehicle and eliminate the standard stop light.

Further objects of this invention reside in the details of construction of the signal light system and in the cooperative relationships between the component parts thereof. Other objects and advantages of this invention will become apparent to those skilled in the art upon reference to the accompanying specification, claims and drawing in which:

Fig. 1 is an elevational view of an automobile having the signal light control system of this invention applied thereto.

Fig. 2 is a wiring diagram illustrating the signal light system of this invention.

Referring first to Fig. 1, the signal light system of this invention is shown to be applied to a motor vehicle such as an automobile, generally designated at 10. It includes a signal light housing 11 which is suspended in the automobile adjacent the rear window 12 thereof with the signal lights facing outwardly through the rear window. This signal light housing may take the form shown and described in the aforementioned Oscar W. Dorfman and Ernest Peters copending application. In the event of original equipment, the signal light housing 11 may be dispensed with and the signal lights suitably built into the rear of the automobile 10.

The signal light system of this invention also includes a switch means 13 which is suitably secured in place adjacent the accelerator mechanism as, for example, on the fire wall 14 under the hood 15 of the automobile. The accelerator mechanism includes linkage mechanism extending between the carburetor 17 and the accelerator 18. The switch means 13 being located adjacent this accelerator linkage mechanism may be connected by a link 19 to any portion thereof, such as a bell crank lever 20. Thus, as the accelerator mechanism is depressed and released the switch means 13 is operated. The signal lights in the signal light housing 11 may be connected by electrical connections 21 to the switch means 13 and by electrical connections 22 to the standard brake operated stop light switch 23 which controls the operation of the standard stop light 24. The switch means may also be connected by suitable electrical connections to the source of voltage of the motor vehicle.

Referring now to Fig. 2, the signal light housing 11 includes red, amber and green signal lights 26, 27 and 28, respectively. One side of the red signal light 26 is connected at 29 to the housing 11 which in turn is connected to ground, as indicated at 31. Likewise, one side of the green signal light 28 is connected, as at 30, to the housing 11 which in turn is connected to ground 31. One side of the amber signal light 27 is connected through a resistance 32 to the housing 11 and, hence, to ground 31. That same side of the amber signal light 27 is also connected by a conductor 33 to the other or ungrounded side of the red signal light 26. In other words, the red and green signal lights 26 and 28 are directly connected to ground through the signal light housing 11 while the amber signal light 27 is electrically insulated from the housing 11 but is connected to ground through the resistor 32.

The switch means 13, which is operated by the accelerator mechanism, preferably is a single pole double throw switch having a common contact 34 and a pair of spaced switch contacts 35 and 36. The link 19 extending from the accelerator mechanism operates the common contact 34 with respect to the spaced switch contacts 35 and 36, the arrangement being such that the common contact 34 engages the switch contact 35 when the accelerator is released, as indicated in the drawing, or engages the other switch contact 36 when the accelerator is depressed. While the single pole double throw switch 13 may be of the mechanical type, as illustrated, it also may be of the mercury switch type as disclosed in the aforementioned copending Charles B. Spangenberg application.

The negative side of the voltage source 38 of the motor vehicle is connected to ground, as indicated at 39, and the positive side thereof may be connected through the standard brake operated stop light switch 23, conductor 40 and the standard stop light 24 to ground, as indicated at 41. Thus, when the vehicle brakes are applied the brake operated switch 23 is closed to illuminate the standard stop light 24.

The positive side of the voltage source 38 may also be connected through an ignition switch 43 and a conductor 44 to the common contact 34 of the single pole double throw switch 13. The switch contact 36 of the accelerator operated switch 13 is connected by a conductor 45 to the other side of the green signal light 28 and, likewise, the other switch contact 35 of the accelerator operated switch 13 is connected by a conductor 46 to the other side of the amber signal light 27. The standard brake operated stop light switch 23 is connected by a conductor 47 to the other side of the red signal light 26 and to the resistor 32.

When the ignition switch 43 is closed and the accelerator mechanism is depressed, a circuit is completed from the voltage source 38 through the ignition switch 43, conductor 44, contacts 34 and 36, conductor 45 and the green signal light 28 to ground to illuminate the green signal light for indicating normal progress or safety. When the accelerator mechanism is released the green signal light 28 is turned off and a circuit is completed from the voltage source 38 through ignition switch 43, conductor 44, contacts 34 and 35, conductor 46, amber signal light 27 and then through parallel paths including red signal light 26 to ground, stop light 24 to ground and resistor 32 to ground. The major portion of the voltage drop in this circuit occurs across the amber signal light 27 for illuminating the amber signal light to indicate coasting, slowdown or caution. The voltage drop across the resistor 32, the red signal light 26 and stop light 24 is relatively small so that the small amount of current passing through conductor 33 and the red signal light 26 to ground and conductors 47 and 40 and the standard stop light 24 to ground is so small as not to illuminate the red signal light 26 or the standard stop light 24. In other words, maximum voltage is applied under these conditions to the amber signal light 27 and minimum voltage is applied to the red signal light 26 and the standard stop light 24. The parallel circuits between the amber signal light 27 and ground, including the resistor 32, the red signal light 26 and the standard stop light 24 carry only a small amount of current, the large portion of the current being consumed by the amber signal light 27. This characteristic operation is brought about by the differential in resistance of the amber signal light 27 when it is hot or illuminated as compared to when it is cold or extinguished.

When the vehicle brakes are applied to close the brake operated stop light switch 23, in addition to completing a circuit through the standard stop light 24 another circuit is also completed from the voltage source 38 through the brake operated switch 23, conductor 47 and the red signal light 26 to ground. This circuit illuminates the red signal light 26 to indicate stopping or danger. A further circuit is also completed by operation of the vehicle brakes from the voltage source 38 through the brake operated switch 23, conductors 47 and 33 and the resistor 32 to ground. This latter circuit applies maximum voltage to the resistor 32 to as to bring the voltage drop across the amber signal light 27 substantially to zero even thought the common contact 34 is engaging the switch contact 35 of the accelerator operated switch 13. This latter circuit, therefore, bucks the current flow through the amber signal light 27 and effectively operates to prevent illumination of the amber signal light 27 when the vehicle brakes are applied to illuminate the red signal light 26.

Thus it is seen that the red, amber and green signal lights 26, 27 and 28 are directly controlled, without the interposition of relays and plural contacts, by the accelerator operated switch means 13 and the standard brake operated switch 23 to perform the desired sequence of operation of the signal lights. If the signal lights are in the form of original equipment wherein they are incorporated in the body of the vehicle, the standard stop light 24 may be omitted and the system will still operate in the manner described above.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A signal light system for use with a motor vehicle having a voltage source, a ground, an accelerator, and a brake; said signal light system comprising, in combination, a stop-light circuit between the voltage source and ground including a normally open single-pole single-throw first switch in series with a stop light, said first switch being adapted to be closed by actuation of said vehicle's brake for illuminating the stop light, a single-pole double-throw second switch means adapted for movement to a first throw position and to a second throw position, and an indicating mechanism including first, second and third signal lights, a first electrical circuit between the voltage source and ground through said first signal light and said second switch means when in one throw position, a portion of a second electrical circuit running from the voltage source through the switch means when in the other throw position and through and beyond the second signal light, a third electrical circuit from the voltage source through said first switch and through said third signal light to ground, an electrical conductor connecting a point in said third circuit, between said third signal light and said first switch, with a point in said second circuit on the side of said second signal light opposite to said voltage source, thereby providing a plurality of parallel electrically conductive paths from said second signal light to ground, one of said parallel paths passing through said third signal light, and said electrical conductor being operative, when said first switch is closed, to apply source voltage to the side of said second signal light opposite to said second switch means, thereby operating to extinguish said second light without resorting to movement of said second switch means.

2. A signal light system for use with a motor vehicle having a voltage source, a ground, an accelerator, and a brake; said signal light system comprising, in combination, a stop-light circuit between the voltage source and ground including a normally open single-pole single-throw first switch in series with a stop light, said first switch being adapted to be closed by actuation of said vehicle's brake for illuminating the stop light, a single-pole double-throw second switch means adapted for movement to a first throw position and to a second throw position, said switch means being normally positioned in said second throw position, and an indicating mechanism including first, second and third signal lights, a first electrical circuit between the voltage source and ground through said second switch means when in the first throw position and through the first signal light, a portion of a second electrical circuit running from the voltage source through the second switch means when in the second throw position and through and beyond the second signal light, a third electrical circuit from the voltage source through said first switch and through said third signal light to ground, an electrical conductor connecting a point in said third circuit, between said third signal light and said first switch, with a point in said second circuit on the side of said second signal light opposite to said voltage source, thereby providing a plurality of parallel electrically conductive paths from said second signal light to ground, one of said parallel paths passing through said third signal light, and said electrical conductor being operative, when said first switch is closed, to apply source voltage to the side of said second signal light opposite to said second switch means, thereby operating to extinguish said second signal light without resorting to breaking of said second circuit.

3. A signal light system for use with a motor vehicle having a voltage source, a ground, an accelerator, and a brake; said signal light system comprising, in combination, a stop-light circuit between the voltage source and ground including a normally open single-pole single-throw first switch in series with a stop light, said first switch being adapted to be closed by actuation of said vehicle's brake for illuminating the stop light, a single-pole double-throw second switch means adapted for movement to a first throw position and to a second throw position, said switch means being normally positioned in said second throw position, and an indicating mechanism including first, second and third signal lights, a first electrical circuit between the voltage source and ground through said second switch means when in the first throw position and through the first signal light, a portion of a second electrical circuit running from the voltage source through the second switch means when in the second throw position and through and beyond the second signal light, a third electrical circuit from the voltage source through said first switch and through said third signal light to ground, an electrical conductor connecting a point in said third circuit, between said third signal light and said first switch, with a point in said second circuit on the side of said second signal light opposite to said voltage source, thereby providing a plurality of parallel eletcrically conductive paths from said second signal light to ground, one of said parallel paths passing through said third signal light, said electrical conductor being operative, when said first switch is closed, to apply source voltage to the side of said second signal light opposite to said second switch means, thereby operating to extinguish said second signal light without resorting to breaking of said second circuit, and said second electrical circuit including a resistor between said second signal light and ground in parallel with said plurality of parallel paths from said second signal light to ground, 4. A signal light system for use with a motor vehicle having a voltage source, a ground, an accelerator, and a brake; said signal light system comprising, in combination, a single-pole single-throw first switch which is adapted to be closed by actuation of the vehicle's brake, a single-pole double-throw second switch means adapted for movement to a first throw position and to a second throw position, said second switch means being normally positioned in said second throw position, and an indicating mechanism including first, second and third signal lights, a first electrical circuit between the voltage source and ground through said second switch means when in the first throw position and through the first signal light, a portion of a second electrical circuit running from the voltage source through the second switch means when in the second throw position and through and beyond the second signal light, a resistor in said second circuit between said second signal light and ground, a third electrical circuit from the voltage source through said first switch and through said third signal light to ground, an electrical conductor connecting a point in said third circuit, between said third signal light and said first switch, with a point in said second circuit on the side of said second signal light opposite to said voltage source, means providing a plurality of parallel electrically conductive paths from said second signal light to ground, one of said parallel paths passing through said third signal light, and said electrical conductor being operative, when said first switch is closed, to apply source voltage to the side of said second signal light opposite to said second switch means, thereby operating to extinguish said second signal light without resorting to breaking of said second circuit.

5. A signal light system for use with a motor vehicle having a voltage source, a ground, an accelerator, and a brake; said signal-light system comprising, in combination, a single-pole single-throw switch which is adapted to be closed by actuation of the vehicle's brake, a double-throw second switch means adapted for movement to a first position and to a second position, and an indicating mechanism including first, second and third signal lights, a first electrical circuit between the voltage source and ground through the first signal light, a portion of a second electrical circuit from the voltage source through and beyond the second signal light, a resistor in said second circuit between said second signal light and ground, a third electrical circuit from the voltage source through said first switch and through said third signal light to ground, an electrical conductor connecting a point in said third circuit, between said third signal light and said first switch, with a point in said second circuit on the side of said second signal light opposite to said voltage source, means providing a plurality of parallel electrically conductive paths from said second signal light to ground, one of said parallel paths passing through said third signal light, said second switch means being operative when in said first position to illuminate said first signal light and to prevent illumination of said second signal light and being operative when in said second position to illuminate said second signal light and to prevent illumination of said first signal light, and said electrical conductor being operative, when said first switch is closed, to apply source voltage to the side of said second signal light opposite to said second switch means, thereby operating to extinguish said second signal light without resorting to movement of said second switch means.

References Cited in the file of this patent
UNITED STATES PATENTS

| 1,909,712 | Oppegaard | May 16, 1933 |
| 2,096,069 | Seiden | Oct. 19, 1937 |
| 2,128,769 | Finnell | Aug. 30, 1939 |
| 2,260,680 | Nelsen | Oct. 28, 1941 |